US010215279B2

(12) United States Patent
Iwatsuru et al.

(10) Patent No.: US 10,215,279 B2
(45) Date of Patent: Feb. 26, 2019

(54) AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Yuji Iwatsuru, Nishio (JP); Yuki Kadokura, Anjo (JP); Kozo Yamamoto, Nagoya (JP); Hirofumi Nakada, Toyota (JP); Hideki Nakagawa, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 15/031,662

(22) PCT Filed: Dec. 24, 2014

(86) PCT No.: PCT/JP2014/084103
§ 371 (c)(1),
(2) Date: Apr. 22, 2016

(87) PCT Pub. No.: WO2015/098938
PCT Pub. Date: Jul. 2, 2015

(65) Prior Publication Data
US 2016/0290504 A1  Oct. 6, 2016

(30) Foreign Application Priority Data
Dec. 25, 2013 (JP) ................. 2013-266540

(51) Int. Cl.
*F16H 63/34* (2006.01)
*F16H 9/12* (2006.01)
(Continued)

(52) U.S. Cl.
CPC ........... *F16H 63/3416* (2013.01); *F16H 9/12* (2013.01); *F16H 61/0021* (2013.01);
(Continued)

(58) Field of Classification Search
CPC ...... F16H 63/3416; F16H 9/12; F16H 61/662; F16H 37/022
See application file for complete search history.

(56) References Cited

U.S. PATENT DOCUMENTS 4,487,302 A * 12/1984 Morimoto .............. B60K 17/04
                                                  192/219.5
4,645,046 A *  2/1987 Takano .................. B60T 1/005
                                                  188/31
(Continued)

FOREIGN PATENT DOCUMENTS

CN          103453137 A    12/2013
EP          0990569 A2 *    4/2000 ............. B60T 1/005
(Continued)

OTHER PUBLICATIONS

Mar. 31, 2015 International Search Report issued in International Patent Application No. PCT/JP2014/084103.

*Primary Examiner* — Stacey A Fluhart
(74) *Attorney, Agent, or Firm* — Oliff PLC

(57) ABSTRACT

A hydraulic control device is disposed forward of a case housing a speed change mechanism in an on-vehicle state. A detent lever is fixed to the control shaft, has a first end connected to a parking rod, and includes a detent recess with which a detent mechanism is engaged. A swing lever includes a shaft serving as a swing center, a first extension extending from one end of the shaft, and a second extension extending from the other end of the shaft. The first extension is connected to a second end of the detent lever. The second extension is connected to a manual valve. An axial position (Continued)

of the manual valve changes in accordance with a rotation angle of the control shaft.

12 Claims, 6 Drawing Sheets

(51) Int. Cl.
*F16H 61/00* (2006.01)
*F16H 61/02* (2006.01)
*F16H 61/662* (2006.01)
*F16H 37/02* (2006.01)

(52) U.S. Cl.
CPC ....... *F16H 61/0265* (2013.01); *F16H 61/662* (2013.01); *F16H 37/022* (2013.01)

(56) References Cited

U.S. PATENT DOCUMENTS

| | | | |
|---|---|---|---|
| 5,526,909 A * | 6/1996 | Ohkawa | B60T 1/005 192/219.5 |
| 6,164,427 A | 12/2000 | Ogawa | |
| 6,581,738 B2 * | 6/2003 | Schafer | B60T 1/005 192/13 R |
| 2005/0233841 A1 * | 10/2005 | Matsubara | F16H 57/031 474/8 |
| 2012/0041652 A1 * | 2/2012 | Martin | F16D 48/066 701/51 |
| 2012/0041656 A1 * | 2/2012 | Martin | B60K 23/0808 701/58 |
| 2012/0247855 A1 * | 10/2012 | Mimura | B60K 1/00 180/216 |
| 2013/0056327 A1 * | 3/2013 | Schraff | F16H 63/3416 192/219.5 |

FOREIGN PATENT DOCUMENTS

| | | |
|---|---|---|
| JP | S60-91055 A | 5/1985 |
| JP | H05-280607 A | 10/1993 |
| JP | H10-274320 A | 10/1998 |
| JP | 2000-104827 A | 4/2000 |
| JP | 2008-144867 A | 6/2008 |
| JP | 2009-243557 A | 10/2009 |

* cited by examiner

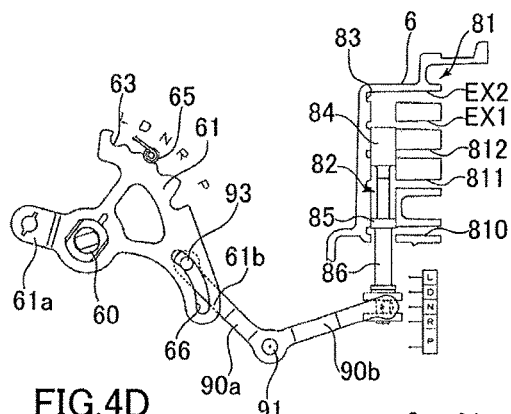
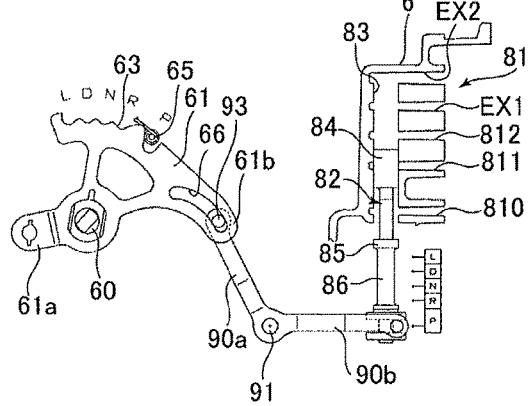
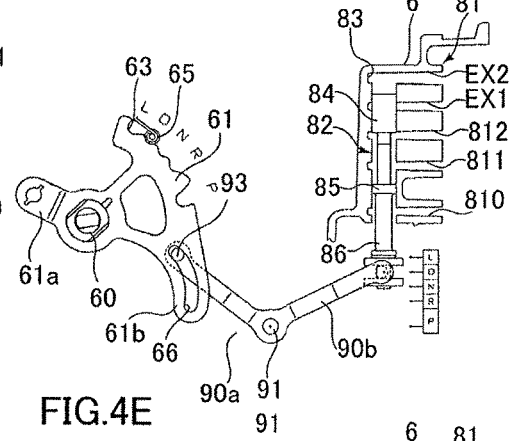
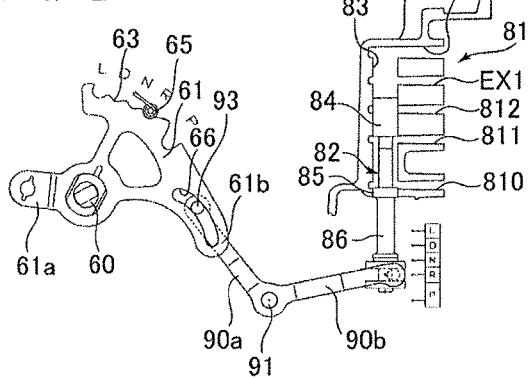
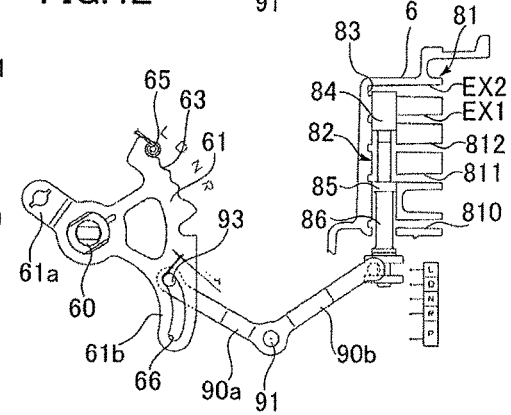

AUTOMATIC TRANSMISSION

TECHNICAL FIELD

The present technique relates to an automatic transmission mounted in a vehicle such as an automobile, and particularly to an automatic transmission that switches a parking mechanism and a range of a hydraulic control device by an operation of a shift operation section.

BACKGROUND ART

In general, an automatic transmission includes, for example, a parking mechanism for causing a vehicle to be in a parking state and a manual valve for setting a range of a hydraulic control device, and can set a desired range such as parking (P), reverse (R), neutral (N), and drive (D) by a user's operation of a shift lever.

In a proposed conventional automatic transmission, an assist lever is coupled to a lower end of a manual shaft that is rotated by an operation of a shift lever so that rotation of the assist lever causes an axial position of a manual valve to change through a valve driving shaft (see Patent Document 1). The automatic transmission is configured in such a manner that a parking rod rotates in conjunction with the manual shaft so that the parking gear is locked.

In another proposed automatic transmission, a lever is interposed between an arm configured to rotate integrally with a detent plate by an operation of a shift lever and a parking rod, and a long hole is formed in the lever to have a shape allowing an engaging pawl provided at a distal end of a parking pawl and a parking gear to be engaged with each other when the shift lever is set in a P range (see Patent Document 2).

RELATED-ART DOCUMENTS

Patent Documents

[Patent Document 1] Japanese Patent Application Publication No. 2008-144867 (JP 2008-144867 A)
[Patent Document 2] Japanese Patent Application Publication No. H05-280607 (JP H05-280607 A)

SUMMARY

In general, a large torque is needed to release a parking gear, and a very large torque is needed to release the parking gear especially when a vehicle is parked on a slope. Thus, an axis of the parking rod for switching the engaging pawl between a meshable state and a release state with respect to the parking gear and each of a control shaft (manual shaft) for moving the parking rod and a detent lever are preferably disposed as close to each other as possible.

In the automatic transmission described in Patent Document 1, the parking rod is linearly extended toward the manual valve and the control shaft for rotating the parking rod can be disposed near the manual valve. However, in a case where the parking rod cannot be extended toward the manual valve because of a complicated speed change mechanism, the parking rod cannot face toward the manual valve and, therefore, the distance between the control shaft and the manual valve increases. In this case, even when the control shaft and the manual valve are connected to each other, the manual valve has a large stroke in an axial direction with respect to a rotation angle of the control shaft, and thus it is difficult to maintain an appropriate relationship between the rotation angle of the control shaft and the stroke of the manual valve in the axial direction.

In the automatic transmission described in Patent Document 2, although a configuration of connection between the control shaft and the manual valve is not described, in a case where the control shaft and the manual valve need to be disposed remotely from each other because of a limitation in displacing the parking rod, for example, it is difficult to maintain an appropriate relationship between the rotation angle of the control shaft and the stroke of the manual valve in the axial direction.

In addition, in recent years, it has been desired to dispose a hydraulic control device in the front part of a case housing a speed change mechanism such as a gear train of an automatic transmission in order to reduce the size of the automatic transmission in the height direction. In the case of disposing a hydraulic control device in this manner, the distance between a manual valve for setting a range of the hydraulic control device and a parking gear increases, resulting in further difficulty in maintaining an appropriate relationship between the rotation angle of the control shaft and a stroke of the manual valve in the axial direction. As described above, there has been a limitation on a degree of freedom for arranging the parking rod, the control shaft, and the manual valve have.

In view of the foregoing problems, it is an object of the present invention to provide an automatic transmission that can enhance the degree of freedom for arrangement of a parking mechanism, a control shaft, and a manual valve with a reduced size of the automatic transmission in the height direction.

Means for Solving the Problem

An automatic transmission according to the present technique is including: a case housing a speed change mechanism;
a hydraulic control device (80) disposed forward of the case (6) in an on-vehicle state;
a first axis disposed rearward of the hydraulic control device in the on-vehicle state and provided with a primary pulley of a belt type continuously variable transmission device;
a second axis disposed rearward of the first axis and provided with a secondary pulley of the belt type continuously variable transmission device and a parking gear;
a control shaft that rotates based on an operation of a shift operation section;
a manual valve used for setting a range of the hydraulic control device based on an axial position of the manual valve and disposed forward of the speed change mechanism in the on-vehicle state;
a parking mechanism including a parking rod for switching a locking pawl between a meshable state in which the locking pawl is allowed to be meshed with the parking gear and a release state;
a detent lever fixed to the control shaft, having a first end connected to the parking rod, and including a detent recess with which a detent mechanism is engaged; and
a swing mechanism including a fulcrum serving as a swing center, a first extension extending from one end of the fulcrum, and a second extension extending from the other end of the fulcrum, and is wherein
the control shaft and the parking rod are disposed between the first axis and the second axis in a front-rear direction, the first extension is connected to a second end of the detent lever, the second extension is connected to the manual valve, and the axial position of the manual valve changes in accordance with a rotation angle of the control shaft.

Since the hydraulic control device is disposed at the front side surface of the case and the control shaft and the parking rod are disposed in a space between the first axis and the second axis, the size of the automatic transmission can be reduced in the height direction. Since the size of the automatic transmission can be reduced in the height direction as described above, even in a case where the control shaft and the manual valve are disposed remotely from each other, connection between the control shaft and the manual valve by the swing mechanism enables a relationship between the rotation angle of the control shaft and a stroke of the manual valve in the axial direction to be appropriately maintained so that the degree of freedom for arrangement of the control shaft, the manual valve, and the parking rod connected to the detent lever can be enhanced.

BRIEF DESCRIPTION OF THE DRAWINGS

FIG. 4 illustrates operation positions of a manual valve, specifically FIG. 4A illustrates an operation position of the manual valve in a P range, FIG. 4B illustrates an operation position of the manual valve in an R range, FIG. 4C illustrates an operation position of the manual valve in an N range, FIG. 4D illustrates an operation position of the manual valve in a D range, and FIG. 4E illustrates an operation position of the manual valve in an L range.

DESCRIPTION

Figure 1:
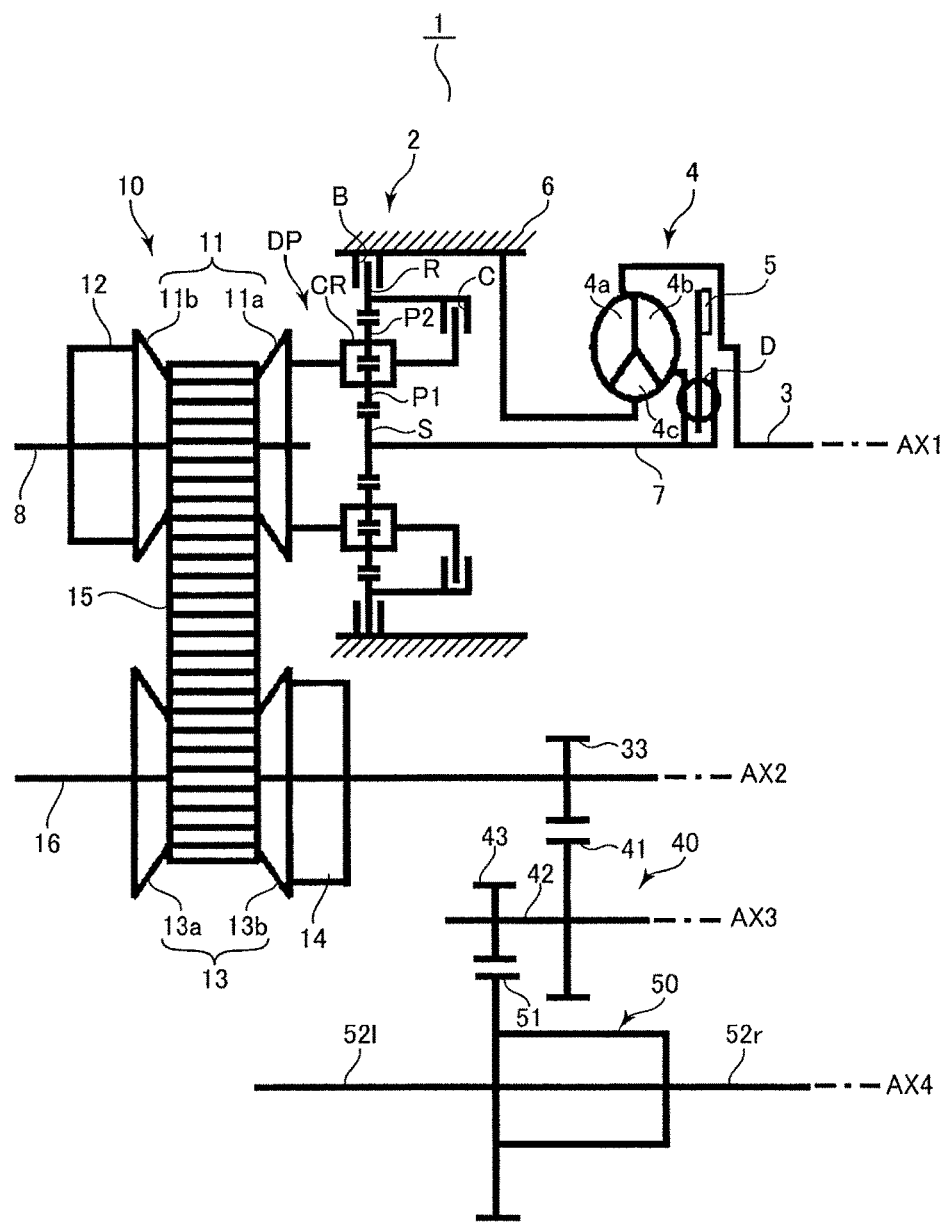
FIG. 1 is a skeleton diagram of an automatic transmission according to an embodiment.

First, a schematic configuration of an automatic transmission 1 according to the present embodiment will be described with reference to FIG. 1.

The automatic transmission 1 has four parallel axes of a first axis AX1 to a fourth axis AX4. On the first axis AX1 that is coaxial with an output shaft (crank shaft) of an internal-combustion engine, an input shaft 3 of the automatic transmission 1 coupled to the output shaft, a torque converter 4 including a lockup clutch, an input shaft 7 of a speed change mechanism 2, a planetary gear DP as a forward-reverse switching mechanism, a clutch C, a brake B, and a primary pulley 11 of a belt type continuously variable transmission device 10 are disposed.

On the second axis AX2, a secondary pulley 13 of the belt type continuously variable transmission device 10 is disposed. On the third axis AX3, a counter shaft section 40 is disposed. On the fourth axis AX4, a differential device 50 and left and right drive shafts 52$l$ and 52$r$ are disposed.

The input shaft 3 is connected to a pump impeller 4$a$ of the torque converter 4. The torque converter 4 includes, as main components, the pump impeller 4$a$, a turbine runner 4$b$ opposed to the pump impeller 4$a$ and connected to the input shaft 7 of the speed change mechanism 2, a stator 4$c$ disposed between the pump impeller 4$a$ and the turbine runner 4$b$ and connected to an unillustrated one-way clutch supported by a transmission case (case) 6, a lockup clutch 5 that causes the input shaft 3 and the input shaft 7 to be directly coupled to each other by engagement, and a damper D that absorbs pulsation of the internal-combustion engine (not shown). The torque converter 4 has an oil tight configuration when being filled with oil.

The input shaft 7 is connected to a sun gear S of the planetary gear DP. The planetary gear DP is a so-called double-pinion planetary gear including the sun gear S, a ring gear R, and a carrier CR rotatably supporting a pinion P1 to be meshed with the sun gear S and a pinion P2 to be meshed with the ring gear R. Among these components, the ring gear R is configured to be capable of locking rotation of the transmission case 6 by using the brake B. The clutch C is interposed between the carrier CR and the ring gear R.

On the other hand, the belt type continuously variable transmission device 10 includes the primary pulley 11 coupled to the carrier CR and configured to rotate together with the pulley shaft 8, the secondary pulley 13, and an endless belt 15 wound around the primary pulley 11 and the secondary pulley 13. The primary pulley 11 has opposed conical wall surfaces, and includes a fixed sheave 11$a$ fixed to the pulley shaft 8 such that the fixed sheave 11$a$ cannot move axially, and a moveable sheave 11$b$ supposed on the pulley shaft 8 such that the moveable sheave 11$b$ can move axially. The belt 15 is held in a groove portion having a V-shaped cross section formed by the fixed sheave 11$a$ and the moveable sheave 11$b$. Similarly, the secondary pulley 13 has opposed conical wall surfaces, and includes a fixed sheave 13$a$ fixed to a center shaft 16 such that the fixed sheave 13$a$ cannot move axially, and a moveable sheave 13$b$ supported on the center shaft 16 such that the moveable sheave 13$b$ can move axially. The belt 15 is held in a groove portion having a V-shaped cross section formed by the fixed sheave 13$a$ and the moveable sheave 13$b$. The fixed sheave 11$a$ of the primary pulley 11 and the fixed sheave 13$a$ of the secondary pulley 13 are disposed at the opposite sides of the belt 15 in the axial direction.

A hydraulic servo 12 is disposed at the back of the moveable sheave 11$b$ of the primary pulley 11. A hydraulic servo 14 is disposed at the back of the moveable sheave 13$b$ of the secondary pulley 13. These hydraulic servos 12 and 14 generate a belt holding pressure corresponding to a load torque when being supplied with a hydraulic pressure, and generates a holding pressure for changing or fixing a speed ratio.

A counter gear 33 is fixed to an end of the center shaft 16 opposite to the secondary pulley 13, and is meshed with a driving gear 41 of the counter shaft section 40. The counter shaft section 40 includes a counter shaft 42, the driving gear 41 fixedly coupled to the counter shaft 42, and a driven gear 43 fixedly coupled to the counter shaft 42. The driven gear 43 is meshed with a differential ring gear 51 of the differential device 50.

The differential device 50 is configured to transmit rotation of the differential ring gear 51 to the left and right drive shafts 52$l$ and 52$r$ while absorbing a rotational difference between the left and right drive shafts 52$l$ and 52$r$. The left and right drive shafts 52$l$ and 52$r$ are respectively coupled to unillustrated left and right wheels. Since the differential ring gear 51 is meshed with the driven gear 43 and the driving gear 41 is meshed with the counter gear 33, the center shaft 16, the counter shaft 42 of the counter shaft section 40, and the differential device 50 are drive-coupled to the wheels through the left and right drive shafts 52$l$ and 52$r$, that is, are always in conjunction with the wheels.

Then, an operation of the automatic transmission 1 will be described. When a vehicle mounted with the automatic transmission 1 travels forward, for example, a stepless shift mode is selected, where the brake B is released and the clutch C is engaged. In this manner, normal rotation input from the internal-combustion engine to the input shaft 7 through the torque converter 4 or the lockup clutch 5 is transmitted as normal rotation to the primary pulley 11, is transmitted as stepless shift rotation from the primary pulley 11 to the secondary pulley 13 through the belt 15 while being steplessly changed in speed, and then is transmitted from the center shaft 16 to the counter gear 33. Rotation of the counter gear 33 is transmitted to the driving gear 41 of the counter shaft section 40. The stepless shift rotation transmitted to the driving gear 41 of the counter shaft section 40 is transmitted to the differential ring gear 51 of the differential device 50 while being decelerated by the driven gear 43, and thereby, normal rotation at a variable speed ratio as the stepless shift mode is output to the wheels through the left and right drive shafts 52*l* and 52*r*.

On the other hand, when a vehicle mounted with the automatic transmission 1 starts traveling backward or travels backward at a speed less than a predetermined speed, a reverse speed mode is selected, where the brake B is locked and the clutch C is released. Then, normal rotation input from the internal-combustion engine to the input shaft 7 through the torque converter 4 or the lockup clutch 5 is output as reverse rotation from the carrier CR in the planetary gear DP. Thus, the reverse rotation is transmitted to the primary pulley 11, is transmitted as stepless shift rotation from the primary pulley 11 to the secondary pulley 13 through the belt 15 while being steplessly changed in speed, and then is transmitted from the center shaft 16 to the counter gear 33. Rotation of the counter gear 33 is transmitted to the driving gear 41 of the counter shaft section 40. The stepless shift rotation transmitted to the driving gear 41 of the counter shaft section 40 is transmitted to the differential ring gear 51 of the differential device 50 while being decelerated by the driven gear 43, and thereby, reverse rotation at a variable speed ratio as the stepless shift mode is output to the wheels through the left and right drive shafts 52*l* and 52*r*.

Figure 2:
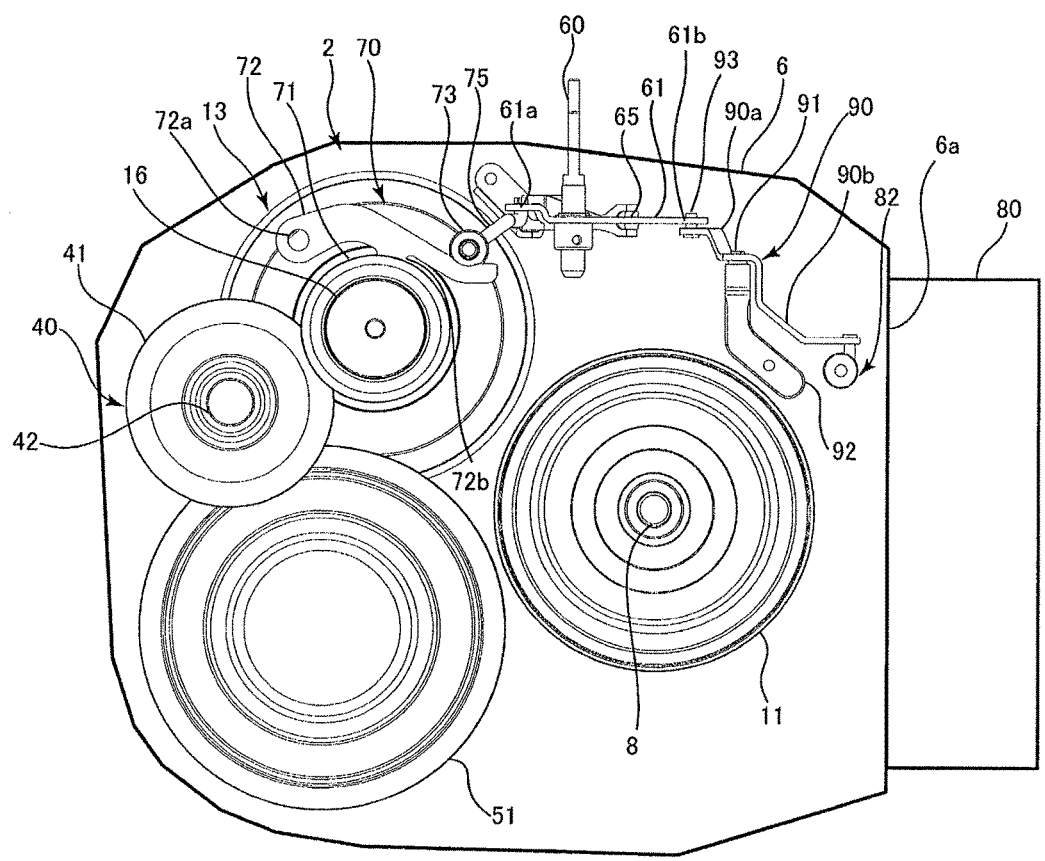
FIG. 2 is an axial view of the automatic transmission according to the embodiment.
Figure 3:
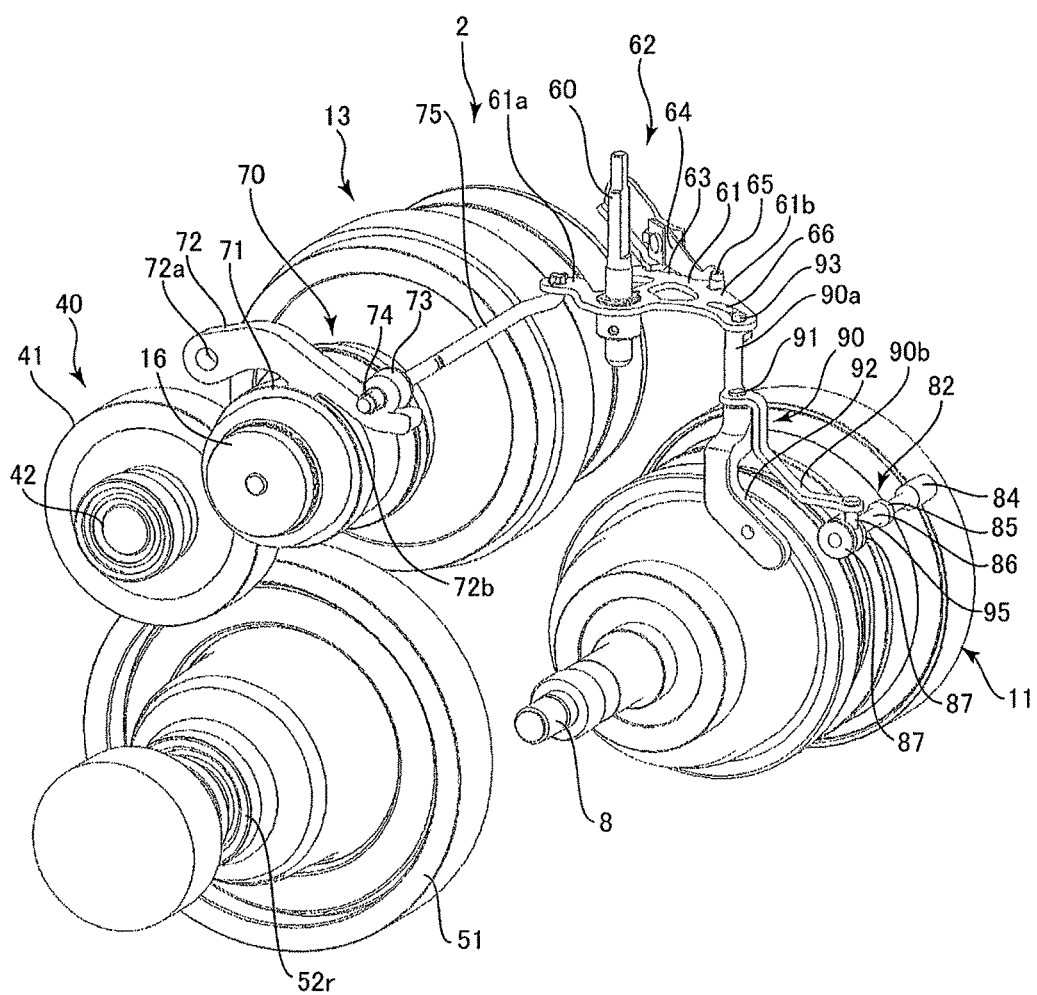
FIG. 3 is a perspective view of the automatic transmission according to the embodiment.

As illustrated in FIGS. 2 and 3, the speed change mechanism 2 is housed in the transmission case 6, and includes a control shaft 60 that rotates based on an operation of an unillustrated shift lever (shift operation section) disposed between the first axis AX1 and the second axis AX2 and placed at, for example, a driver's seat, and a parking mechanism 70. The control shaft 60 is supposed by the transmission case 6 and vertically extends. A detent lever 61 in the shape of a horizontally oriented flat plate is fixed to an intermediate portion of the control shaft 60. A detent recess 63 with which the detent mechanism 62 is to be engaged is formed in an outer peripheral portion of the detent lever 61. The detent recess 63 is composed of a plurality of grooves corresponding to shift ranges of the shift lever.

More specifically, the detent mechanism 62 includes a detent arm 64 and a detent roller 65 attached to a distal end of the detent arm 64. The detent roller 65 is biased toward the detent recess 63 of the detent lever 61 by an unillustrated coil spring. Thus, when the detent lever 61 rotates in accordance with rotation of the control shaft 60, the detent roller 65 is sequentially engaged with the grooves of the detent recess 63 so that the control shaft 60 gradually rotates by a predetermined angle at each time. In the present embodiment, a parking (P) range, a reverse (R) range, a neutral (N) range, a drive (D) range, and a low (L) range are provided in correspondence with the respective grooves of the detent recess 63.

The parking mechanism 70 includes a parking gear 71 fixed to the center shaft 16, a parking pawl 72, and a parking rod 75 whose distal end portion includes a cam 73 and a stopper member 74 and whose proximal end portion is connected to a first end 61*a* of the detent lever 61. The parking pawl 72 is swingably disposed in a vertical direction in the drawings around a swing fulcrum 72*a* provided in the proximal end portion. A locking pawl 72*b* that can be meshed with a gear groove of the parking gear 71 projects downward from an intermediate portion of the parking pawl 72. The parking pawl 72 is always biased by an unillustrated spring in a direction away from the parking gear 71 and is in a release state. The parking pawl 72 is configured not to be in contact with the parking gear 71 while a vehicle is traveling, i.e., in a non-parking state, for example.

The parking rod 75 is curved so as not to interfere with the secondary pulley 13 on the second axis AX2. The cam 73 provided at a tip of the parking rod 75 can slide along the parking rod 75, and the stopper member 74 prevents the cam 73 from coming off the parking rod 75. In addition, the cam 73 is biased by an unillustrated coil spring toward the stopper member 74.

A valve body 80 (hydraulic control device) is attached to a front side surface 6*a* of the transmission case 6. In an on-vehicle state in which the automatic transmission 1 is mounted in a vehicle, the valve body 80 is disposed forward of the transmission case 6. That is, in the on-vehicle state, the valve body 80, the first axis AX1, and the second axis AX2 are arranged in this order from front to rear. In a front-rear direction, the control shaft 60 and the parking rod 75 are disposed between the first axis AX1 and the second axis AX2. Thus, the size of the automatic transmission 1 can be reduced in the height direction.

A range pressure setting unit 81 for setting a range of the valve body 80 is provided at an inner wall of the front side surface 6*a* of the transmission case 6 (see FIG. 4). The range pressure setting unit 81 is provided with a hole 83 in which a manual valve 82 composed of a spool is slidably supported, an R-range pressure port 810, a line pressure port 811, a D-range pressure port 812, a D-range pressure drain port EX1, and a drain port EX2. The range of the valve body 80 is set depending on an axial position of the manual valve 82. The manual valve 82 is disposed on a side opposite to the second axis AX2 with respect to the first axis AX1 and at an end on a side where the valve body 80 is disposed.

As illustrated in FIG. 3, the manual valve 82 includes a first land 84, a second land 85, and a spool shaft 86. The first land 84 has an approximately cylindrical shape that is slidable in the hole 83, and is disposed at a distal end of the spool shaft 86. The second land 85 has an approximately cylindrical shape that is slidable in the hole 83, and is disposed in an intermediate portion of the spool shaft 86 separated from the first land 84 by a predetermined distance. The proximal end of the spool shaft 86 and a second end 61*b* of the detent lever 61 are connected to each other by a swing lever 90 (swing mechanism) to be described later. The axial position of the manual valve 82 changes in accordance with a rotation angle of the control shaft 60 and the detent lever 61.

The swing lever 90 is swingable on a fulcrum shaft 91 serving as a fulcrum. The fulcrum shaft 91 is rotatably supported on a fulcrum shaft member 92 that can be detachably attached to the transmission case 6. The swing lever 90 includes a first extension 90*a* extending from one end of the fulcrum shaft 91 and a second extension 90*b* extending from the other end of the fulcrum shaft 91. A pin 93 projects outward from a distal end portion of the first extension 90*a*.

The pin 93 is engaged with a long hole 66 formed in the second end 61b of the detent lever 61. In this manner, the detent lever 61 is slidably connected to the first extension 90a of the swing lever 90 so that one linkage can be omitted as compared to a case where the lever and the extension are connected by a three joint link. Thus, the cost and space can be reduced.

A pin 95 projects downward from a distal end portion of the second extension 90b. The pin 95 is held between two flanges 87 and 87 rotatably supported on a proximal end portion of the spool shaft 86 of the manual valve 82. With this configuration, the axial position of the manual valve 82 is changed by swinging the second extension 90b about the fulcrum shaft 91. The shape and curvature of the long hole 66 formed in the detent lever 61 are set such that the range width of the detent recess 63 corresponds to the range of the manual valve 82, and a shift operation can be performed accurately.

Then, an operation of the manual valve 82 in each range will be described with reference to FIG. 4. As illustrated in FIG. 4A, in a case where the detent roller 65 is engaged with a groove of the detent recess 63 corresponding to the P range by a driver's shift operation, the line pressure port 811 is blocked so that the brake B and the clutch C are released. At this time, the parking rod 75 connected to the detent lever 61 is driven to slide toward the parking gear 71 and the parking pawl 72 and becomes a meshable state. The cam 73 disposed at the distal end portion of the parking rod 75 is biased toward the parking pawl 72 while being also biased by an unillustrated coil spring. In a phase in which the locking pawl 72b of the parking pawl 72 is not meshed with the parking gear 71, the cam 73 stands by at a position at which the cam 73 pushes the parking pawl 72. In a phase in which the locking pawl 72b of the parking pawl 72 is meshed with the parking gear 71, the cam 73 moves to a position at which the cam 73 overlaps the parking pawl 72, and contacts the stopper member 74 to be positionally fixed.

As illustrated in FIG. 4B, in a case where the detent roller 65 is engaged with a groove of the detent recess 63 corresponding to the R range, the line pressure port 811 and the R-range pressure port 810 communicate with each other. In this manner, the speed change mechanism 2 changes to the reverse speed mode described above, where the brake B is locked and the clutch C is released.

As illustrated in FIG. 4C, in a case where the detent roller 65 is engaged with a groove of the detent recess 63 corresponding to the N range, a hydraulic oil is supplied from the line pressure port 811 to space between the first land 84 and the second land 85, but the space does not communicate with other ports. Thus, in a manner similar to the case of the P range, the brake B and the clutch C are released in the speed change mechanism 2.

As illustrated in FIG. 4D, in a case where the detent roller 65 is engaged with a groove of the detent recess 63 corresponding to the D range, the line pressure port 811 and the D-range pressure port 812 communicate with each other. Thus, the speed change mechanism 2 changes to the stepless shift mode described above, where the brake B is released and the clutch C is engaged.

As illustrated in FIG. 4E, in a case where the detent roller 65 is engaged with a groove of the detent recess 63 corresponding to the L range, the line pressure port 811 and the D-range pressure port 812 communicate with each other, and it is electrically recognized that the valve is in the L range. Thus, the speed change mechanism 2 changes to a stepless shift mode in which the speed ratio of the belt type continuously variable transmission device 10 is at a low-speed state, and the brake B is released and the clutch C is engaged.

The present embodiment has the foregoing configuration, and the control shaft 60 is rotated by a driver's operation of the shift lever. At this time, since the detent recess 63 of the detent lever 61 fixed to the control shaft 60 is engaged with the detent mechanism 62, the control shaft 60 gradually rotates by a predetermined angle at each time in correspondence with the P range, the R range, the N range, the D range, and the L range.

Because of the limitation on arrangement, the control shaft 60 and the manual valve 82 are disposed relatively remotely from each other. However, when the detent lever 61 in conjunction with the control shaft 60 rotates, an axial stroke of the manual valve 82 occurs in such a manner that the range of the valve body 80 is appropriately set through the swing lever 90 that swings using, as a swing center, the fulcrum shaft 91 disposed between the first extension 90a and the second extension 90b.

In this manner, although the control shaft 60 and the manual valve 82 are disposed remotely from each other, the range of the valve body 80 can be appropriately set. Thus, the degree of freedom for arrangement of the parking rod 75 connected to the detent lever 61, the control shaft 60, and the manual valve 82 can be enhanced. Since the manual valve 82 does not need a large driving torque, a mechanism connecting the control shaft 60 and the manual valve 82 to each other does not require high rigidity, and thus, the control shaft 60 and the manual valve 82 can be disposed remotely from each other.

In addition, since the fulcrum shaft member 92 including the fulcrum shaft 91 is attachable to the transmission case 6, the swing lever 90 can be assembled to the transmission case 6 after assembly of other parts such as the detent lever 61 and the manual valve 82. Thus, assemblability can be enhanced. The position of attachment of the fulcrum shaft member 92 to the transmission case 6 may be adjusted by using a long hole and a bolt, for example, so that a relationship between the rotation angle of the control shaft 60 and the axial position of the manual valve 82 can be finely adjusted by adjusting the position of attachment of the fulcrum shaft member 92.

In addition, since the manual valve 82 and the fulcrum shaft member 92 supporting the swing lever 90 are supported by the same transmission case 6, as compared to a configuration in which the swing lever 90 is supported by the transmission case 6 and the manual valve 82 is supported by the valve body 80 as a separate part from the transmission case 6, the manual valve 82 is less affected by accuracy in attaching the valve body 80 to the transmission case 6. As a result, the manual valve 82 can be accurately operated.

In the present embodiment, the pin 93 is provided on the first extension 90a, and the long hole 66 engaged with the pin 93 is provided in the detent lever 61. Alternatively, the pin 93 may be provided on the detent lever 61 side with the long hole 66 engaged with the pin 93 being provided in the first extension 90a.

The length of the swing lever 90 can be freely set in accordance with the distance from the control shaft 60 to the manual valve 82. In the present embodiment, the length ratio between the first extension 90a and the second extension 90b is approximately 1:1. In a case where a ratio of a movable range of the pin 93 of the first extension 90a to a movable range of the manual valve 82 in the axial direction is not 1:1, the length of the swing lever 90 may be adjusted by changing the length ratio between the first extension 90a and the second extension 90b.

The manual valve 82 may be supported in the inside of the valve body 80. In this case, the fulcrum shaft member 92 may be configured to be attachable to the valve body 80.

Next, with reference to FIGS. 5 and 6, another embodiment will be described. The following description is directed only to differences from the embodiment described above, specifically, configurations of a detent lever, a manual valve, and a connection portion between the detent lever and the manual valve. Components similar to those already described in the above embodiment are not illustrated or are given the same reference numerals in the drawings to omit description thereof.

A detent lever 100 in the shape of a horizontally oriented flat plate is fixed to an intermediate portion of a control shaft 60. A detent recess 101 with which a detent mechanism 62 is to be engaged is formed in an outer peripheral portion of the detent lever 100. The detent recess 101 is composed of a plurality of grooves corresponding to shift ranges of the shift lever. When the detent lever 100 rotates in accordance with rotation of the control shaft 60, the detent roller 65 is sequentially engaged with the grooves of the detent recess 101 so that the control shaft 60 gradually rotates by a predetermined angle at each time. A parking rod 75 is connected to a first end 102 of the detent lever 100.

A manual valve 110 includes a first land 111, a second land 112, and a spool shaft 113. The first land 111 is disposed in an intermediate portion of the spool shaft 113. The second land 112 is disposed at a distal end of the spool shaft 113. Each of the first land 111 and the second land 112 has an approximately cylindrical shape and is slidable in a hole 83 formed in the range pressure setting unit 81. In a manner similar to the embodiment described above, a range pressure setting unit 81 according to this embodiment includes an R-range pressure port 810, a line pressure port 811, a D-range pressure port 812, a D-range pressure drain port EX1, and a drain port EX2. However, these ports are reversely arranged as compared to those in the above embodiment in the axial direction of the manual valve 110.

A crank member 120 (swing mechanism) is rotatably supported on a fulcrum shaft member 92 using a fulcrum shaft 91 as a fulcrum. The crank member 120 has an approximately L shape, and includes a first extension 121 extending from one end of the fulcrum shaft 91 and a second extension 122 extending from the other end of the fulcrum shaft 91, that is, extending to form an approximately right angle with the first extension 121.

A distal end portion 122a of the second extension 122 is connected to a proximal end portion of the manual valve 110. A distal end portion 121a of the first extension 121 is connected to an end portion 103 (second end) near a groove corresponding to the L range of the detent lever 100 through a connecting rod 123. The connecting rod 123 has a round rod shape bending at an intermediate portion thereof. However, the connecting rod 123 may have any shape.

Figure 6:
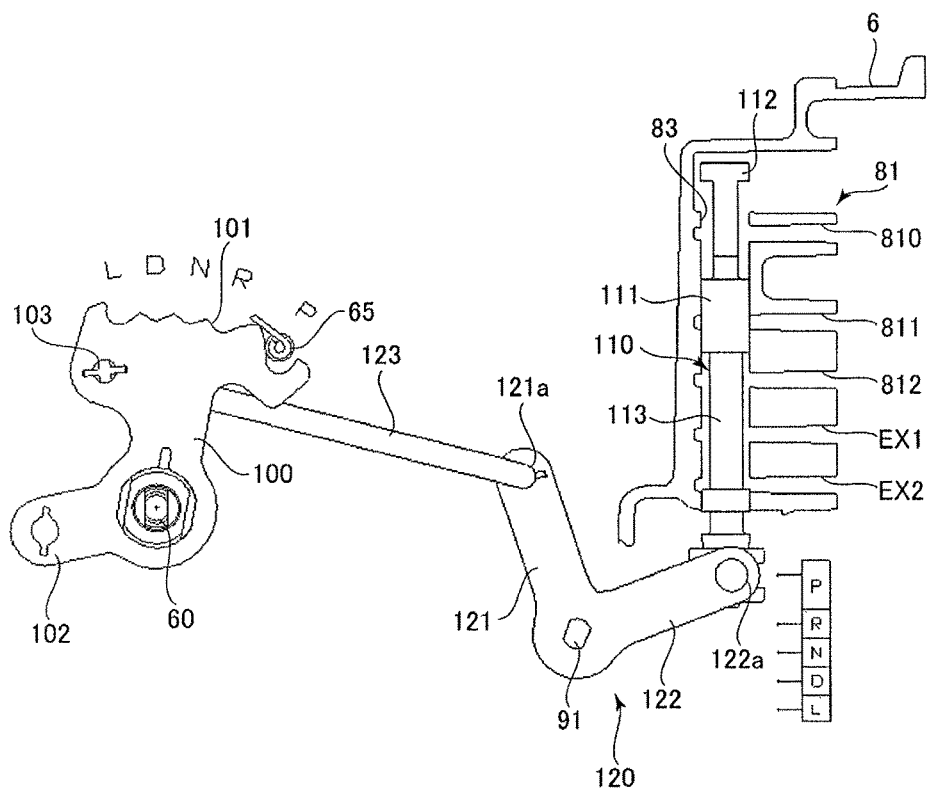
FIG. 6 illustrates an operation position of a manual valve according to another embodiment.

In FIG. 6, when the detent lever 100 rotates clockwise, for example, the crank member 120 rotates clockwise through the connecting rod 123. Then, when the distal end portion 122a of the second extension 122 moves substantially downward, the manual valve 110 moves downward so that a range pressure from each port of the range pressure setting unit 81 is set as necessary. In this embodiment, the direction of movement of the manual valve 110 with respect to the direction of rotation of the detent lever 100 is opposite to the direction in the above embodiment. However, the ports of the range pressure setting unit 81 corresponding to the ranges are similar to those in the above embodiment, and thus, description thereof is omitted.

The amount of axial movement of the manual valve 110 can be freely adjusted by changing a radius of rotation of the end portion 103 of the detent lever 100 and a ratio of distance between the fulcrum shaft 91 and the distal end portion 121a of the first extension 121 to distance between the fulcrum shaft 91 and the distal end portion 122a of the second extension 122. In this embodiment, the range width of the detent recess 101 corresponds to the range of the manual valve 110.

In this embodiment, with the foregoing configuration, the control shaft 60 is rotated by a driver's operation of the shift lever. At this time, since the detent recess 101 of the detent lever 100 fixed to the control shaft 60 is engaged with the detent mechanism 62, the control shaft 60 gradually rotates by a predetermined angle at each time so as to correspond to the P range, the R range, the N range, the D range, and the L range.

Although the control shaft 60 and the manual valve 110 are disposed relatively remotely from each other, rotation of the control shaft 60 based on a driver's shift operation is appropriately transmitted to the manual valve 110 through the detent lever 100, the connecting rod 123, and the crank member 120. In this manner, the degree of freedom for in arrangement of the parking rod 75 connected to the detent lever 61, the control shaft 60, and the manual valve 110 can be enhanced.

Since connection between the detent lever 100 and the crank member 120 is ensured by the connecting rod 123, transmission of rotation of the detent lever 100 based on rotation of the control shaft 60 to the manual valve 110 is ensured so that a shift operation can be accurately performed.

Summary of Embodiments

Referring to FIG. 3 or FIG. 4, for example, the pin (93) is disposed on one of the detent lever (61) and the first extension (90a), and the long hole (66) to be engaged with the pin (93) is disposed in one of the detent lever (61) and the first extension (90a) so that the detent lever (61) is slidably connected to the first extension (90a). Thus, as compared to a case where a detent lever and a first extension are connected to each other by a three joint link, for example, one linkage can be omitted so that the cost and space can be reduced.

Referring to FIG. 3 or FIG. 4, for example, the curvature of the long hole (66) is set in such a manner that the range width of the detent recess (63) of the detent lever (61) corresponds to the axial position of the manual valve (82) for which the range is set. Thus, a shift operation can be accurately performed with enhanced the degree of freedom for designing the detent lever and the swing mechanism.

Figure 5:
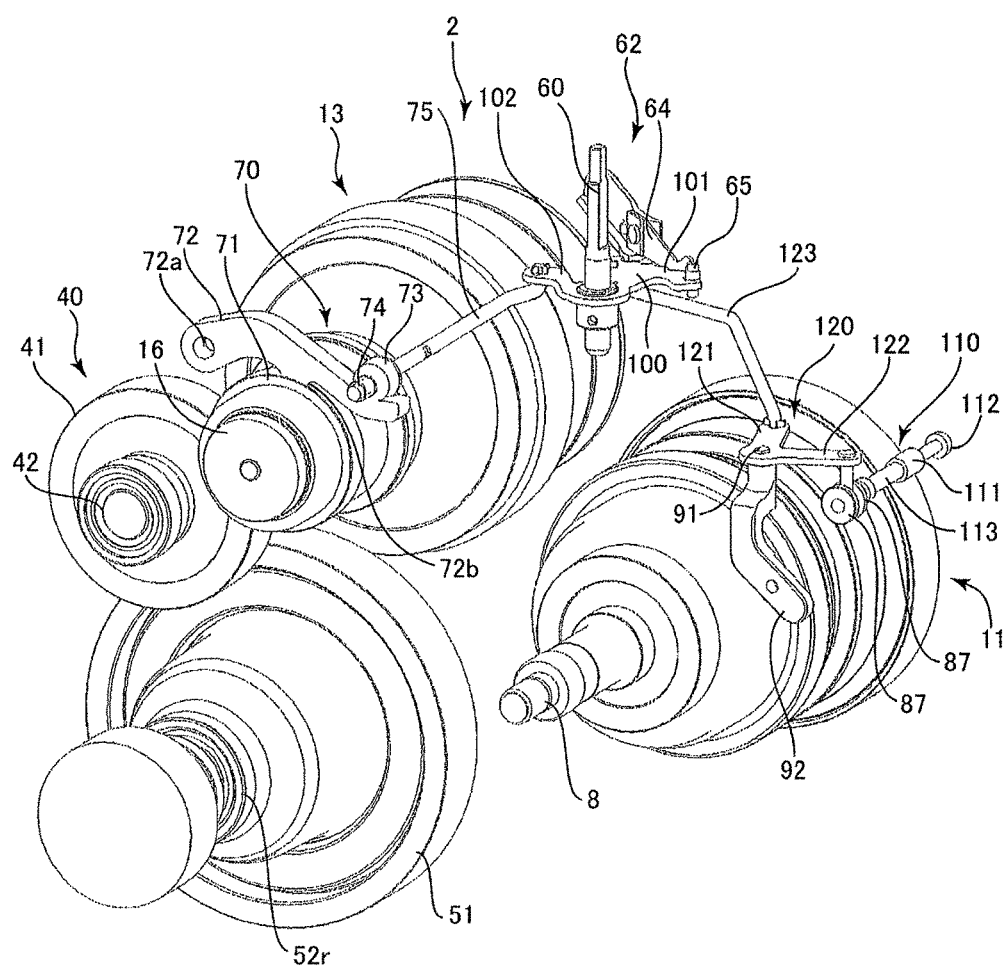
FIG. 5 is a perspective view of an automatic transmission according to another embodiment.

Referring to FIGS. 5 and 6, for example, the first extension (121) is connected to the second end (103) of the detent lever (100) through the connecting rod (123). This configuration ensures transmission of rotation of the detent lever based on rotation of the control shaft to the swing mechanism, thereby performing a shift operation accurately.

Referring to FIG. 2, for example, the automatic transmission (1) includes the fulcrum shaft member (92) having a shaft engaged with the swing mechanism (90, 120) and serving as the fulcrum (91). The fulcrum shaft member (92) is attachable to the case (6). Thus, the swing mechanism can be easily assembled to the case after assembly of other parts, and thus, assemblability can be enhanced.

Referring to FIG. 4 or FIG. 6, for example, the case (6) is provided with the range pressure setting unit (81) for setting the range of the hydraulic control device (80) by switching the range in accordance with the axial position of the manual valve (82, 110), and the manual valve (82, 110) is supported in the hole (83) formed in the range pressure setting unit (81). In this manner, as compared to a configuration in which a swing mechanism is supported by the case and a manual valve is supported by a hydraulic control device as a separate part from the case, for example, the manual valve is less affected by accuracy in attaching the hydraulic control device to the case. As a result, the manual valve can be accurately operated.

In the above description, the parenthesized reference numerals are used for reference to the drawings merely for facilitating understanding of the invention, and is not intended to have any influence on the scope of the claims.

The automatic transmission 1 of this embodiment is for an FF type, but may be for an FR type. The automatic transmission 1 may be used for multiple speeds shifting, and for a hybrid device to be combined with a motor.

DESCRIPTION OF THE REFERENCE NUMERALS 1 automatic transmission
2 speed change mechanism
6 transmission case (case)
6a front side surface
10 belt type continuously variable transmission device
11 primary pulley
13 secondary pulley
60 control shaft
61, 100 detent lever
61a, 102 first end
61b, 103 end portion (second end)
62 detent mechanism
63, 101 detent recess
66 long hole
70 parking mechanism
71 parking gear
72b locking pawl
75 parking rod
80 valve body (hydraulic control device)
81 range pressure setting unit
82, 110 manual valve
83 hole
90, 120 swing lever, crank member (swing mechanism)
90a, 121 first extension
90b, 122 second extension
91 shaft, fulcrum shaft (fulcrum)
92 fulcrum shaft member
93 pin
123 connecting rod
AX1 first axis
AX2 second axis

The invention claimed is:

1. An automatic transmission, comprising:
a case housing a speed change mechanism;
a hydraulic control device disposed forward of the case in an on-vehicle state;
a first axis disposed rearward of the hydraulic control device in the on-vehicle state, and provided with a primary pulley of a belt type continuously variable transmission device;
a second axis disposed rearward of the first axis and provided with a secondary pulley of the belt type continuously variable transmission device and a parking gear;
a control shaft that rotates based on an operation of a shift operation section;
a manual valve used for setting a range of the hydraulic control device based on an axial position of the manual valve and disposed forward of the speed change mechanism in the on-vehicle state;
a parking mechanism including a parking rod for switching a locking pawl between a meshable state in which the locking pawl is allowed to be meshed with the parking gear and a release state;
a detent lever fixed to the control shaft, having a first end connected to the parking rod, and including a detent recess with which a detent mechanism is engaged; and
a swing mechanism including a fulcrum shaft serving as a swing center, a first extension extending from the fulcrum shaft in one direction, and a second extension extending from the fulcrum shaft in another direction, wherein
the control shaft and the parking rod are disposed between the first axis and the second axis in a front-rear direction,
the first extension is connected to a second end of the detent lever, the second extension is connected to the manual valve, and the axial position of the manual valve changes in accordance with a rotation angle of the control shaft, and
the fulcrum shaft of the swing mechanism is provided on a third axis that is parallel to and separate from a fourth axis of the control shaft, and the fulcrum shaft is between the control shaft and the hydraulic control device.

2. The automatic transmission according to claim 1, wherein
a pin is disposed on one of the detent lever and the first extension,
a long hole to be engaged with the pin is disposed in the other one of the detent lever and the first extension, and the detent lever is slidably connected to the first extension.

3. The automatic transmission according to claim 2, wherein
a curvature of the long hole is set in such a manner that a range width of the detent recess of the detent lever corresponds to the axial position of the manual valve for which the range is set.

4. The automatic transmission according to claim 3, wherein
the fulcrum shaft is attachable to the case.

5. The automatic transmission according to claim 4, wherein
the case is provided with a range pressure setting unit for setting a range of the hydraulic control device by switching the range in accordance with the axial position of the manual valve, and
the manual valve is supported in a hole provided in the range pressure setting unit.

6. The automatic transmission according to claim 2, wherein
the fulcrum shaft is attachable to the case.

7. The automatic transmission according to claim 6, wherein
the case is provided with a range pressure setting unit for setting a range of the hydraulic control device by switching the range in accordance with the axial position of the manual valve, and the manual valve is supported in a hole provided in the range pressure setting unit.

8. The automatic transmission according to claim 1, wherein the first extension is connected to the second end of the detent lever through a connecting rod.

9. The automatic transmission according to claim 8, wherein the fulcrum shaft is attachable to the case.

10. The automatic transmission according to claim 9, wherein the case is provided with a range pressure setting unit for setting a range of the hydraulic control device by switching the range in accordance with the axial position of the manual valve, and the manual valve is supported in a hole provided in the range pressure setting unit.

11. The automatic transmission according to claim 1, wherein the fulcrum shaft is attachable to the case.

12. The automatic transmission according to claim 11, wherein the case is provided with a range pressure setting unit for setting a range of the hydraulic control device by switching the range in accordance with the axial position of the manual valve, and the manual valve is supported in a hole provided in the range pressure setting unit.

* * * * *